(No Model.)
G. R. F. VON STEGMANN.
BICYCLE.
No. 577,990. Patented Mar. 2, 1897.
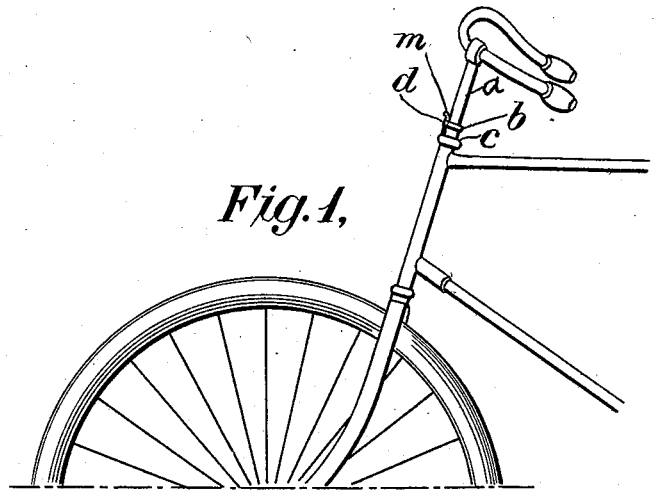
Fig. 1.
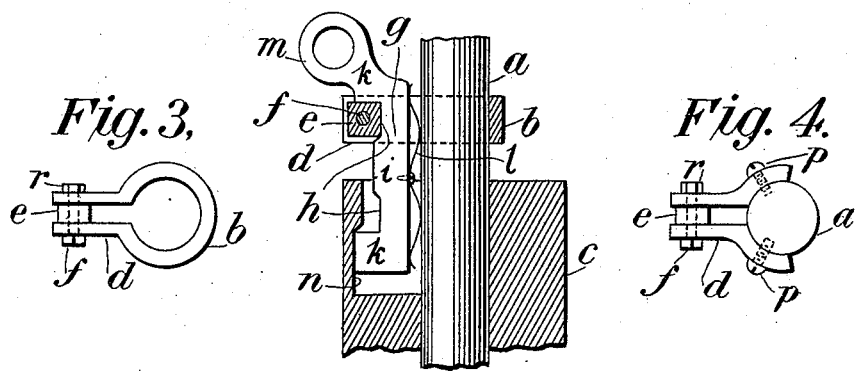
Fig. 2.
Fig. 3. Fig. 4.
Witnesses
Richard J. Elliott.
John P. Nordstrom.
Georg R. F. von Stegmann Inventor
By Schreiter & Van Iderstine
Attorneys.
THE NORRIS PETERS CO., PHOTO-LITHO., WASHINGTON, D. C.

UNITED STATES PATENT OFFICE.

GEORG R. F. VON STEGMANN, OF NEW YORK, N. Y.

BICYCLE.

SPECIFICATION forming part of Letters Patent No. 577,990, dated March 2, 1897.

Application filed April 13, 1896. Serial No. 587,342. (No model.)

*To all whom it may concern:*

Be it known that I, GEORG R. F. VON STEGMANN, a subject of the Emperor of Germany, residing in New York, county and State of New York, have invented certain new and useful Improvements in Bicycles, of which the following is a specification.

My invention relates to bicycles and similar vehicles; and it consists of the hereinafter-described attachment to the forked stem for locking the steering-wheel in position.

My invention is illustrated in the accompanying drawings, wherein—

Figure 1 is a side elevation of a part of a bicycle, showing my attachment in position on the forked stem. Fig. 2 is a vertical section, on an enlarged scale, showing the key in position locking the forked stem to the frame. Fig. 3 is a top view of the guiding-ring secured to the forked stem. Fig. 4 is a top view of a modified form of the guiding-ring.

Similar letters of reference indicate corresponding parts in all the views.

Bicycles when not in use are usually leaned against a supporting object. The steering-wheel is, however, if not especially fastened, likely to turn by being accidentally pushed or from other causes, and thus sliding away from the support causes the bicycle to fall to the ground. The fastening of the steering-wheel is often cumbersome and yet insecure, and to overcome this inconvenience I have invented my improved attachment.

To the forked stem $a$ of the bicycle is clamped the ring $b$, above the upper rim of socket $c$ of the frame, in which the forked stem $a$ turns. This ring $b$ has two flanges $d$ extending outward, and between these flanges is secured by bolt $f$ the block $e$. Bolt $f$ passes through the flanges $d$ and through the block $e$, and by screwing on the nut $r$ the flanges $d$ are pressed together and ring $b$ clamped tightly on the forked stem $a$. Between block $e$ and the forked-stem $a$ slides key $g$, made of a flat piece of metal with a straight back, and two depressions $h$ on the front, separated by a slightly-elevated portion $i$, and with flanges $k$ at each end. The depressions $h$ correspond in size with the rectangular block $e$. To the back of the key $g$ is riveted the spring $l$, pressing the key against the piece $e$ and thus sustaining it in position. A handle $m$ or other suitable means of grasping the key $g$ by the hand is provided at the upper end of the key $g$.

In the socket $c$ of the frame are made slots $n$, either in the front or on the two sides, but I have found it best to provide all three. The guiding-ring $b$ is clamped to the forked stem $a$ just above the upper rim of socket $c$, and when the steering-wheel is turned in position key $g$ is pushed down in one of the slots $n$, thus locking the forked stem in that position. The wheel then cannot be turned in the socket until key $g$ is again withdrawn from the slot.

A modified form of the ring $b$ is shown in Fig. 4. In this construction the ring does not extend around the forked stem $a$, but only a short portion of the flanges being secured to the forked stem by the screws $p$ on each side.

I claim and desire to secure by Letters Patent—

A locking device for the steering-wheels of bicycles and similar vehicles, comprising guiding-flanges secured to the forked stem above the socket of the frame, a locking-block, set between the flanges, a key sliding vertically between the guiding-flanges, a tension-spring set between the key and the forked stem and pressing it against the locking-block, depressions in the key adapted to engage the block and hold it in position and slots in the socket of the frame adapted to receive the end of the key whereby said forked stem is locked in position relatively to the socket.

In witness that I claim the improvements described in the foregoing specification I have signed my name in the presence of two subscribing witnesses.

GEORG R. F. VON STEGMANN.

Witnesses:
RICHARD I. ELLIOTT,
JOHN P. NORDSTROM.